United States Patent [19]

Critelli

[11] 3,937,418
[45] Feb. 10, 1976

[54] RETRACTABLE DOG LEASH
[75] Inventor: Frank Critelli, Pompano Beach, Fla.
[73] Assignee: Lawrence Peska Associates, Inc., New York, N.Y. ; a part interest
[22] Filed: Jan. 13, 1975
[21] Appl. No.: 540,691

[52] U.S. Cl............................ 242/107.4 R; 119/109
[51] Int. Cl.²......................................... B65H 75/48
[58] Field of Search......... 242/107.4, 107.6, 107.12; 119/109; 74/578

[56] References Cited
UNITED STATES PATENTS

| | | | |
|---|---|---|---|
| 2,217,323 | 10/1940 | Sackett | 242/107.4 |
| 2,776,644 | 1/1957 | Fontaine | 242/107.4 X |
| 3,233,591 | 2/1966 | Rogers | 119/109 |
| 3,693,596 | 9/1972 | Croce | 242/107.4 |
| 3,823,893 | 7/1974 | Svensson | 74/578 X |

FOREIGN PATENTS OR APPLICATIONS

| | | | |
|---|---|---|---|
| 788,170 | 12/1957 | United Kingdom | 119/109 |
| 444,375 | 1/1949 | Italy | 242/107.4 |

Primary Examiner—Edward J. McCarthy
Attorney, Agent, or Firm—Jack D. Slobod

[57] ABSTRACT

A retractable dog leash having a spring loaded wheel for rewinding a portion of the leash which has extended therefrom. Disposed at one axial portion of the wheel is a circular member having a plurality of recesses disposed circumferencially. A blocking member is selectively positioned in engagement in one of the recesses.

1 Claim, 5 Drawing Figures

RETRACTABLE DOG LEASH

BACKGROUND OF THE INVENTION

The field of the invention relates to dog leashes and particularly of the type which rewind the leash which has been payed out to a dog. Such apparatus has been heretofor known to be relatively bulky and did not facilitate great control by the user thereof.

Accordingly it is the primary object of the invention to provide apparatus which enables the user thereof to control the passage of the leash on and off of the reel therein.

It is still another object of the invention to provide apparatus which is simple and inexpensive to manufacture and which is compact and therefore easy for the operator to carry.

DESCRIPTION OF A PREFERRED EMBODIMENT

Figure 1:
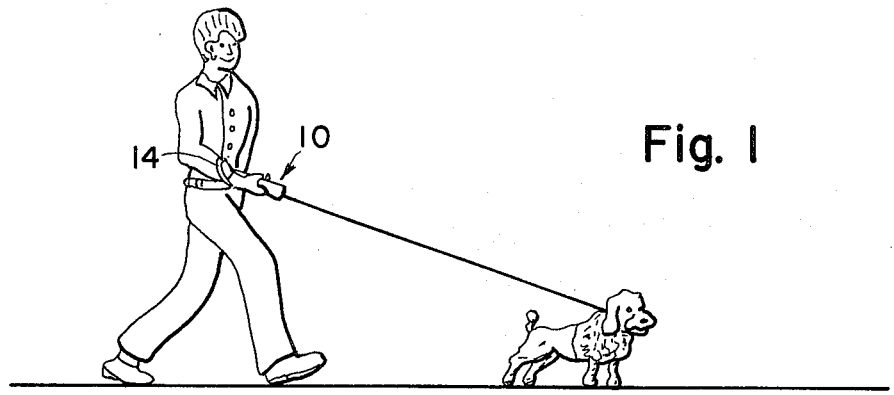
FIG. 1 is a perspective view showing a user and a dog in addition to the apparatus in accordance with the invention.
Figure 2:
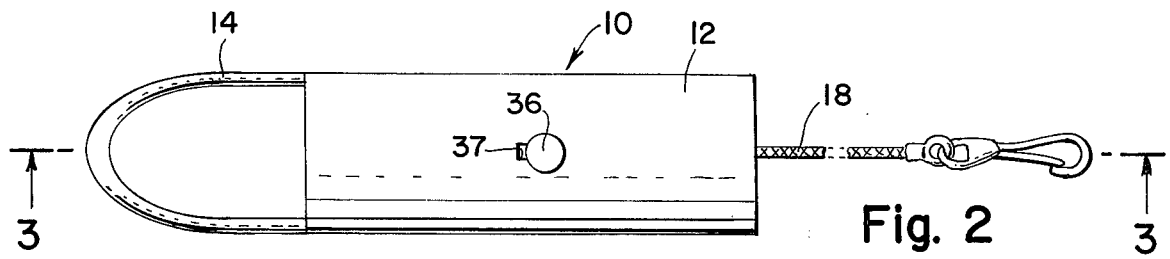
FIG. 2 is a side elevational view of the apparatus in accordance with the invention.
Figure 3:
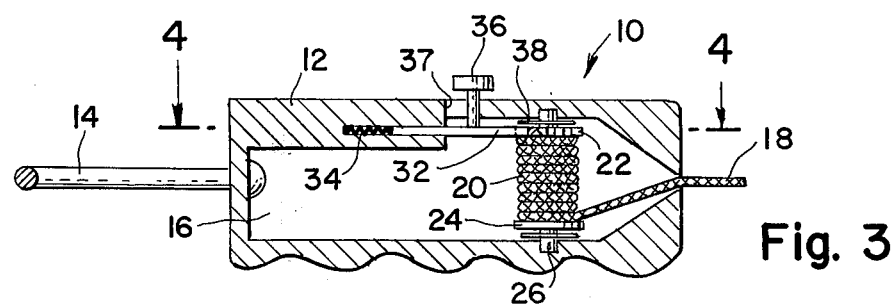
FIG. 3 is a sectional view taken through the line 3—3 of FIG. 2.

Referring now to FIGS. 1, 2 and 3 there is shown one form of the invention innerly designated by the numeral 10. The apparatus includes a generally cylindrical casing 12 having at one end a strap for engagement with the wrist of the user extending from a passageway 16. At the opposite end of the casing 10 is a cord 18 which most commonly will be nylon. Nylon material is particularly desirable because of its high strength to bulk ratio, durability, and elasticity. The latter characteristic is particularly desirable if a large dog is being walked.

The cord 18 is carried within the casing 10 on a reel 20 having at axially space extremities thereof ratchet wheels 22, 24. The ratchet wheel 22, 24 are fixed to the axis 26 of the reel and rotate therewith. The ratchet wheel 22 has disposed circumferencially about the edge thereof a plurality of recesses 30 which are best shown in FIGS. 4 and 5.

Figures 4, 5:
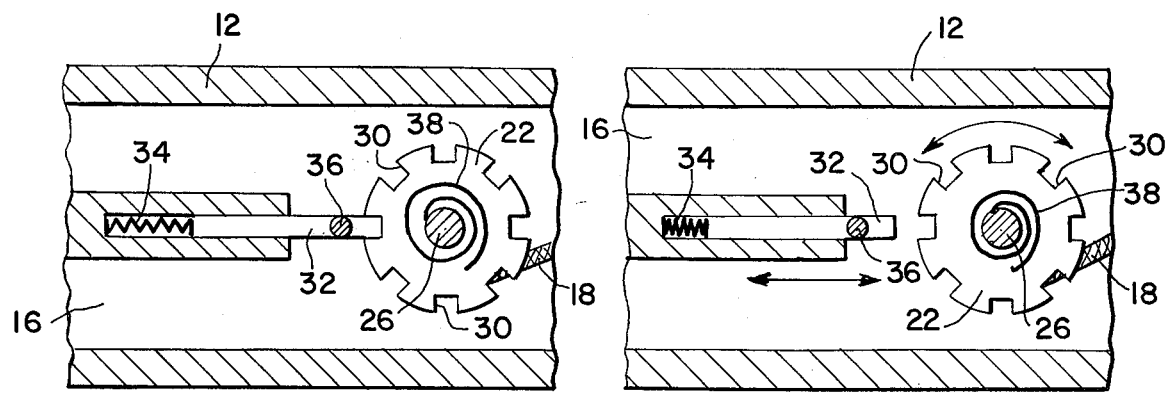
FIG. 4 is a sectional view taken through the line 4—4 of FIG. 3.
FIG. 5 is a sectional view also taken through the line 4-4 of FIG. 3 and showing an ultimate position of the apparatus therein.

As is best seen in FIGS. 4 and 5 elongated shaft 32 is carried within a portion of the casing 12 for reciprocal movement toward and away from the circumference of the ratchet wheel 22. A spring 34 is provided for urging the shaft 32 toward the circumference of 22. A button 36 is fixed to member 32 and extends through a slot 36 in the casing 12 so that it may be selectively urged toward or away from the ratchet wheel 22. It will be seen that because of the spring loading provided by spring 34 that the member 32 will be urged into blocking relationship with the ratchet wheel 22 if it is not manually retracted. This is particularly desirable since the operator will wish to not only limit the amount of cord that can be released at any one time, but also the amount that can be withdrawn into the casing 12 at any time. The requirements will vary with the conditions peculiar to the area in which the dog is being walked as well as other factors peculiar to the dog and the person walking the dog. A coil spring 38 is disposed at one axial extremity of the reel 20 to provide the desired rotary action to place the cord 18 on the reel. It will be understood that various alternative arangements are possible including the use of a hollow shaft 26 in which the coil spring may extend at one axial extremity of the shaft 26 in engagement with the housing 12 to the other extremity of the shaft 26 where it is in contact with the shaft itself. This alternative is desirable to insure that an adequate number of coils are provided. It is still another alternative which will be apparent to those skilled in the art to use a coiled spring like device such as that which was first disclosed about 1967 and which was widely acclaimed as providing a unique spring apparatus. The apparatus of that type could be used by means of connecting one end to the axis or shaft 26 and the opposite end thereof in radially spaced relationship thereto at the casing 12. The construction in accordance with that type of spring device or a concentrical spring disposed within the shaft 26 will permit the product to be manufactured with a relatively small diameter casing 12. It is believed that casings as small as 3″ may be feasible.

Having thus described the invention, what is claimed as new is:

1. A retractable dog leash comprising a housing elongated in a longitudinal direction; an aperture at one end of said housing communicating from the interior to the exterior of said housing; a reel journalled within said housing for rotation about an axis generally perpendicular to said longitudinal direction; a cord wound about said reel and having a free end passing through said aperture; means on the free end of said cord for attaching said cord to a dog collar; first spring means coupled to said reel for torqueing said reel in a direction for winding said cord thereon; a ratchet wheel coupled fixedly to said reel coaxial therewith, said ratchet wheel having a plurality of recesses about its periphery; an elongated longitudinally directed member mounted slideably within said housing radially of said ratchet wheel, said elongated member having an end facing said ratchet wheel configured for engagement with one of said recesses for blocking rotation of said reel; second spring means for urging said elongated member into engagement with said ratchet wheel; a longitudinally elongated slot in a side of said housing; and a shaft projecting perpendicularly and fixedly from said elongated member and through said slot to enable moving said elongated member out of engagement with said ratchet wheel.

* * * * *